United States Patent
Devers et al.

(10) Patent No.: US 11,773,337 B2
(45) Date of Patent: Oct. 3, 2023

(54) PROCESS FOR THE HYDROSULFURIZATION OF SULFUR-CONTAINING OLEFINIC GASOLINE CUTS USING A REGENERATED CATALYST HAVING AN ORGANIC COMPOUND

(71) Applicant: IFP Energies nouvelles, Rueil-Malmaison (FR)

(72) Inventors: Elodie Devers, Rueil-Malmaison (FR); Etienne Girard, Rueil-Malmaison (FR); Philibert Leflaive, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 223 days.

(21) Appl. No.: 17/414,878

(22) PCT Filed: Dec. 10, 2019

(86) PCT No.: PCT/EP2019/084439
§ 371 (c)(1),
(2) Date: Jun. 16, 2021

(87) PCT Pub. No.: WO2020/126678
PCT Pub. Date: Jun. 25, 2020

(65) Prior Publication Data
US 2022/0056348 A1 Feb. 24, 2022

(30) Foreign Application Priority Data
Dec. 18, 2018 (FR) ........................................ 1873237

(51) Int. Cl.
| | | |
|---|---|---|
| *C10G 45/08* | (2006.01) | |
| *B01J 23/94* | (2006.01) | |
| *B01J 35/10* | (2006.01) | |
| *B01J 37/02* | (2006.01) | |
| *B01J 37/20* | (2006.01) | |

(52) U.S. Cl.
CPC .............. *C10G 45/08* (2013.01); *B01J 23/94* (2013.01); *B01J 35/1014* (2013.01); *B01J 35/1019* (2013.01); *B01J 37/0209* (2013.01); *B01J 37/20* (2013.01); *C10G 2300/202* (2013.01); *C10G 2300/4018* (2013.01); *C10G 2300/70* (2013.01)

(58) Field of Classification Search
CPC ................... C10G 45/08; C10G 65/12; C10G 2300/1088; C10G 2300/202; C10G 2300/207; C10G 2300/4018; C10G 2300/4081; C10G 2300/701; C10G 65/04; B01J 21/04; B01J 23/882; B01J 35/1014; B01J 35/1019; B01J 38/12; B01J 37/20
See application file for complete search history.

(56) References Cited

U.S. PATENT DOCUMENTS

| | | | |
|---|---|---|---|
| 6,280,610 B1 * | 8/2001 | Uragami | ............. B01J 31/0204 502/313 |
| 2002/0010086 A1 | 1/2002 | Plantenga et al. | |
| 2005/0159295 A1 | 7/2005 | Ginestra et al. | |
| 2007/0275845 A1 | 11/2007 | Jansen et al. | |
| 2009/0258779 A1 * | 10/2009 | McCarthy | .............. C10G 45/10 502/24 |
| 2010/0133148 A1 | 6/2010 | Timmer et al. | |
| 2011/0094939 A1 | 4/2011 | Jansen et al. | |
| 2018/0133706 A1 | 5/2018 | Carrette | |
| 2019/0105648 A1 | 4/2019 | Laurenti et al. | |

FOREIGN PATENT DOCUMENTS

| | | | | |
|---|---|---|---|---|
| EP | 3315195 A1 | 5/2018 | | |
| EP | 3338887 A1 | 6/2018 | | |
| WO | 9641848 A1 | 12/1996 | | |
| WO | 2005035691 A1 | 4/2005 | | |
| WO | 2007084471 A1 | 7/2007 | | |
| WO | WO-2007084471 A1 * | 7/2007 | ............. | B01J 21/08 |
| WO | 2009126278 A2 | 10/2009 | | |
| WO | 2016173760 A1 | 11/2016 | | |
| WO | 2017167522 A1 | 10/2017 | | |

OTHER PUBLICATIONS

International Search Report for PCT/EP2019/084439 dated Jan. 24, 2020.
English Abstract of EP-3315195, Publication Date: May 2, 2018.
English Abstract of EP-3338887, Publication Date: Jun. 27, 2018.

* cited by examiner

*Primary Examiner* — Randy Boyer
*Assistant Examiner* — Juan C Valencia
(74) *Attorney, Agent, or Firm* — MILLEN, WHITE, ZELANO & BRANIGAN, PC; Ryan Pool

(57) ABSTRACT

The invention relates to a process for the hydrodesulfurization of a sulfur-containing olefinic gasoline cut in which said gasoline cut, hydrogen and a rejuvenated catalyst are brought into contact, said hydrodesulfurization process being carried out at a temperature of between 200° C. and 400° C., a total pressure of between 1 and 3 MPa, an hourly space velocity, defined as being the flow rate by volume of feedstock relative to the volume of catalyst, of between 1 and 10 $h^{-1}$ and a hydrogen/gasoline feedstock ratio by volume of between 100 and 1200 Sl/l, said rejuvenated catalyst resulting from a hydrotreating process and comprises at least one metal from group VIII, at least one metal from group VIb, an oxide support and at least one organic compound containing oxygen and/or nitrogen and/or sulfur.

14 Claims, No Drawings

US 11,773,337 B2

PROCESS FOR THE HYDROSULFURIZATION OF SULFUR-CONTAINING OLEFINIC GASOLINE CUTS USING A REGENERATED CATALYST HAVING AN ORGANIC COMPOUND

FIELD OF THE INVENTION

The present invention relates to a process for the hydrodesulfurization of a gasoline cut employing a rejuvenated catalyst.

STATE OF THE ART

Sulfur is an element naturally present in crude oil and is thus present in gasoline and diesel fuel if it is not removed during refining. However, sulfur in gasoline interferes with the efficiency of emission reduction systems (catalytic converters) and contributes to air pollution. In order to combat environmental pollution, all countries are consequently gradually adopting strict sulfur specifications, the specifications being, for example, 10 ppm (weight) of sulfur in commercial gasolines in Europe, China, the United States and Japan. The problem of reducing sulfur contents is essentially focused on gasolines obtained by cracking, whether catalytic (FCC, Fluid Catalytic Cracking) or non-catalytic (coking, visbreaking, steam cracking), the main precursors of sulfur in gasoline pools.

One solution, well known to a person skilled in the art, for reducing the sulfur content consists in carrying out a hydrotreating (or hydrodesulfurization) of the hydrocarbon cuts (and in particular of catalytic cracking gasolines) in the presence of hydrogen and of a heterogeneous catalyst. However, this process exhibits the major disadvantage of causing a very significant drop in the octane number if the catalyst employed is not sufficiently selective. This reduction in the octane number is linked in particular to the hydrogenation of the olefins present in this type of gasoline concomitantly with the hydrodesulfurization.

Unlike other hydrotreating processes, in particular those for feedstocks of gas oil type, the hydrodesulfurization of gasolines thus has to make it possible to respond to a double antagonistic constraint: to provide extreme hydrodesulfurization of gasolines and to limit the hydrogenation of the unsaturated compounds present.

The most widely used route for responding to the double problem mentioned above consists in employing processes in which the sequence of unit stages makes it possible simultaneously to maximize the hydrodesulfurization while limiting the hydrogenation of the olefins. Thus, the most recent processes, such as the Prime G+ (trademark) process, make it possible to desulfurize cracked gasolines rich in olefins, while limiting the hydrogenation of the mono-olefins and consequently the loss of octane and the high hydrogen consumption which results therefrom. Such processes are, for example, described in the patent applications EP 1 077 247 and EP 1 174 485.

Obtaining the desired reaction selectivity (ratio of hydrodesulfurization to hydrogenation of olefins) can thus be partly due to the choice of the process but, in all cases, the use of an intrinsically selective catalytic system is very often a key factor. In general, the catalysts used for this type of application are catalysts of sulfide type containing an element from group VIb (Cr, Mo, W) and an element from group VIII (Fe, Ru, Os, Co, Rh, Ir, Pd, Ni, Pt). Thus, in the patent U.S. Pat. No. 5,985,136, it is claimed that a catalyst exhibiting a surface concentration of between $0.5 \times 10^{-4}$ and $3 \times 10^{-4}$ g of $MoO_3/m^2$ makes it possible to achieve high selectivities in hydrodesulfurization (93% hydrodesulfurization (HDS) against 33% hydrogenation of olefins (HOO)). Furthermore, according to the patents U.S. Pat. Nos. 4,140,626 and 4,774,220, it can be advantageous to add a dopant (alkali metal, alkaline earth metal) to the conventional sulfide phase (CoMoS) with the aim of limiting the hydrogenation of olefins. The documents U.S. Pat. No. 8,637,423 and EP 1 892 039, which describe selective hydrodesulfurization catalysts, are also known in the state of the art.

During its use for the hydrotreating of a petroleum cut, a hydrotreating catalyst experiences a decrease in its activity due to the deposition of coke and/or of compounds which are sulfur-based or contain other heteroelements. Beyond a certain period, its replacement is thus necessary. In particular, the tightening of the sulfur specifications of fuels induces an increase in the frequency of replacement of the catalyst, which leads to an increase in the cost associated with the catalyst and to an increase in the amount of spent catalyst.

In order to combat these disadvantages, the regeneration (gentle calcination) of catalysts for the hydrodesulfurization of middle distillates (gas oil) or of spent residues is an economically and ecologically advantageous process because it makes it possible to use these catalysts again in industrial units rather than to landfill them or to recycle them (recovery of the metals). However, the regenerated catalysts are generally less active than the starting solids. Thus, the patent application US2011/0079542 indicates that, after regeneration, a typical commercially available catalyst for the hydrotreating of distillates can have a reactivity from approximately 75% to approximately 90% of the activity of the corresponding fresh catalyst.

In order to solve this problem, these regenerated catalysts are generally additivated with various organic agents ("rejuvenation" stage) in the field of middle distillates. Many patents, such as, for example, U.S. Pat. Nos. 7,906,447, 8,722,558, 7,956,000, 7,820,579 or also CN102463127, thus provide different methods for carrying out the rejuvenation of the catalysts for the hydrotreating of middle distillates. Catalysts for the hydrodesulfurization of middle distillates, which have high contents of metals in comparison with the catalysts for the selective hydrodesulfurization of gasolines, experience significant sintering during use and during regeneration. Thus, the rejuvenation treatments are focused on the dissolution and the redistribution of the metal phases in order to recover a dispersion close to the fresh catalyst and therefore an activity close to the fresh catalyst.

Catalysts for the selective hydrodesulfurization of gasolines exhibit different regeneration issues from catalysts for the hydrotreating of gas oils, in particular due to the need to maintain the selective nature of the catalyst with respect to reactions for hydrodesulfurization and hydrogenation of olefins. This is because an increase in the selectivity is generally more desirable than an increase in or maintenance of the activity in the field of gasolines. As regards the selective hydrodesulfurization of gasolines, while the conventional regeneration can be envisaged, a person skilled in the art, in view of what has been demonstrated for the catalysts for the hydrotreating of middle distillates, expects the catalyst to exhibit a significantly lower activity than that of the fresh catalyst and with a potentially reduced selectivity, due to the structural changes in the active phase supported on the catalyst during the regeneration.

Such a rejuvenation process is described for a spent catalyst for the selective hydrodesulfurization of FCC gasolines in the patent CN105642312. This complex process employs, in addition to an organic agent, one or more metal additives containing at least one element chosen from Na, K, Mg, Ca, Cu and Zn; and a heat treatment with an atmosphere having the oxygen content controlled.

There thus still exists today a keen interest among refiners for processes for the hydrodesulfurization in particular of gasoline cuts which exhibit good catalytic performance qualities, in particular in terms of catalytic activity in hydrodesulfurization and of selectivity, making possible the employment of catalysts resulting from spent hydrotreating catalysts.

Subject Matters of the Invention

The invention thus relates to a process for the hydrodesulfurization of a sulfur-containing olefinic gasoline cut in which said gasoline cut, hydrogen and a rejuvenated catalyst are brought into contact, said hydrodesulfurization process being carried out at a temperature of between 200° C. and 400° C., a total pressure of between 1 and 3 MPa, an hourly space velocity, defined as being the flow rate by volume of feedstock relative to the volume of catalyst, of between 1 and 10 $h^{-1}$ and a hydrogen/gasoline feedstock ratio by volume of between 100 and 1200 Sl/l, said rejuvenated catalyst resulting from a hydrotreating process and comprises at least one metal from group VIII, at least one metal from group VIb, an oxide support and at least one organic compound containing oxygen and/or nitrogen and/or sulfur.

This is because it has been observed that the use of a rejuvenated catalyst having an organic compound in a process for the selective hydrodesulfurization of gasolines only resulted in a very small loss in activity compared with the use of the same fresh catalyst and surprisingly brought about an improvement in the selectivity. Without being committed to any theory, it seems that the changes with regard to the active phase caused by the rejuvenation of the catalyst and bringing about a better selectivity toward the hydrodesulfurization reaction of the active sites make it possible to compensate for the reduction in the number of these sites and thus maintain the activity of the catalyst.

According to one alternative form, the organic compound containing oxygen and/or nitrogen and/or sulfur is chosen from a compound comprising one or more chemical functional groups chosen from a carboxylic, alcohol, thiol, thioether, sulfone, sulfoxide, ether, aldehyde, ketone, ester, carbonate, amine, nitrile, imide, oxime, urea or amide functional group or also compounds including a furan ring or also sugars.

According to one alternative form, the organic compound containing oxygen and/or nitrogen and/or sulfur is chosen from γ-valerolactone, 2-acetylbutyrolactone, triethylene glycol, diethylene glycol, ethylene glycol, ethylenediaminetetraacetic acid, maleic acid, malonic acid, citric acid, gluconic acid, di($C_1$-$C_4$ alkyl) succinate, glucose, fructose, sucrose, sorbitol, xylitol, γ-ketovaleric acid, dimethylformamide, 1-methyl-2-pyrrolidinone, propylene carbonate, 2-methoxyethyl 3-oxobutanoate, bicine, tricine, 2-furaldehyde, 5-hydroxymethylfurfural, 2-acetylfuran, 5-methyl-2-furaldehyde, ascorbic acid, butyl lactate, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1-(2-hydroxyethyl)-2-pyrrolidinone, 1-(2-hydroxyethyl)-2,5-pyrrolidinedione, 5-methyl-2(3H)-furanone, 1-methyl-2-piperidinone and 4-aminobutanoic acid.

According to one alternative form, the rejuvenated catalyst has a content of metal from group VIb of between 1% and 40% by weight of oxide of said metal from group VIb, with respect to the total weight of the rejuvenated catalyst, and a content of metal from group VIII of between 0.1% and 10% by weight of oxide of said metal from group VIII, with respect to the total weight of the rejuvenated catalyst.

According to one alternative form, the rejuvenated catalyst additionally contains phosphorus, the phosphorus content being between 0.3% and 10% by weight, expressed as $P_2O_5$, with respect to the total weight of the rejuvenated catalyst and the phosphorus/(metal from group VIb) molar ratio in the rejuvenated catalyst is between 0.1 and 0.7.

According to one alternative form, the rejuvenated catalyst is characterized by a specific surface of between 20 and 200 $m^2/g$, preferably of between 30 and 180 $m^2/g$.

According to one alternative form, the oxide support of the rejuvenated catalyst is chosen from aluminas, silica, silica-aluminas or also titanium or magnesium oxides, used alone or as a mixture with alumina or silica-alumina.

According to one alternative form, the rejuvenated catalyst contains residual carbon at a content of less than 2% by weight, with respect to the total weight of the rejuvenated catalyst. According to one alternative form, the rejuvenated catalyst contains residual sulfur at a content of less than 5% by weight, with respect to the total weight of the rejuvenated catalyst.

According to one alternative form, the rejuvenated catalyst is subjected to a sulfidation stage before or during the hydrodesulfurization process.

According to one alternative form, the gasoline cut is a gasoline resulting from a catalytic cracking unit.

According to one alternative form, the process is carried out in a catalytic bed of a reactor of the fixed bed type containing several catalytic beds; at least one other catalytic bed upstream or downstream of the catalytic bed containing the rejuvenated catalyst in the direction of the circulation of the feedstock contains at least in part a fresh catalyst and/or a regenerated catalyst.

According to one alternative form, the process is carried out in at least two reactors in series of the fixed bed type or of the ebullated bed type; at least one of the reactors contains a rejuvenated catalyst while another reactor contains a fresh catalyst or a regenerated catalyst, or a mixture of a rejuvenated catalyst and of a fresh and/or regenerated catalyst, in any order, with or without removal of at least a part of the $H_2S$ from the effluent resulting from the first reactor before treating said effluent in the second reactor.

Subsequently, the groups of chemical elements are given according to the CAS classification (CRC Handbook of Chemistry and Physics, published by CRC Press, editor D. R. Lide, 81$^{st}$ edition, 2000-2001). For example, group VIII according to the CAS classification corresponds to the metals from columns 8, 9 and 10 according to the new IUPAC classification.

DESCRIPTION OF THE INVENTION

The invention thus relates to a process for the hydrodesulfurization of a sulfur-containing olefinic gasoline cut in which said gasoline cut, hydrogen and a rejuvenated catalyst are brought into contact, said hydrodesulfurization process being carried out at a temperature of between 200° C. and 400° C., a total pressure of between 1 and 3 MPa, an hourly space velocity, defined as being the flow rate by volume of feedstock relative to the volume of catalyst, of between 1 and 10 $h^{-1}$ and a hydrogen/gasoline feedstock ratio by volume of between 100 and 1200 Sl/l, said rejuvenated catalyst resulting from a hydrotreating process and comprises at least one metal from group VIII, at least one metal from group VIb, an oxide support and at least one organic compound containing oxygen and/or nitrogen and/or sulfur.

The hydrodesulfurization process according to the invention makes it possible to transform the organosulfur compounds of a gasoline cut into hydrogen sulfide ($H_2S$) while limiting as much as possible the hydrogenation of the olefins present in said cut.

Feedstock to be Treated

The process according to the invention makes it possible to treat any type of sulfur-containing olefinic gasoline cut, such as, for example, a cut resulting from a coking, visbreaking, steam cracking or catalytic cracking (FCC, Fluid Catalytic Cracking) unit. This gasoline can optionally be composed of a significant fraction of gasoline originating from other production processes, such as atmospheric distillation (gasoline resulting from a direct distillation (or straight run gasoline)), or from conversion processes (coking or steam cracking gasoline). Said feedstock preferably consists of a gasoline cut resulting from a catalytic cracking unit.

The feedstock is a sulfur-containing olefinic gasoline cut, the boiling point range of which typically extends from the boiling points of the hydrocarbons having 2 or 3 carbon atoms (C2 or C3) up to 260° C., preferably from the boiling points of the hydrocarbons having 2 or 3 carbon atoms (C2 or C3) up to 220° C., more preferably from the boiling points of the hydrocarbons having 5 carbon atoms up to 220° C. The process according to the invention can also treat feedstocks having lower end points than those mentioned above, such as, for example, a C5-180° C. cut.

The sulfur content of the gasoline cuts produced by catalytic cracking (FCC) depends on the sulfur content of the feedstock treated by the FCC, the presence or not of a pretreatment of the feedstock of the FCC, as well as on the end point of the cut. Generally, the sulfur contents of the whole of a gasoline cut, in particular those originating from the FCC, are greater than 100 ppm by weight and most of the time greater than 500 ppm by weight. For gasolines having end points of greater than 200° C., the sulfur contents are often greater than 1000 ppm by weight; they can even, in certain cases, reach values of the order of 4000 to 5000 ppm by weight.

In addition, the gasolines resulting from catalytic cracking (FCC) units contain, on average, between 0.5% and 5% by weight of diolefins, between 20% and 50% by weight of olefins and between 10 ppm and 0.5% by weight of sulfur, generally less than 300 ppm of which of mercaptans. The mercaptans are generally concentrated in the light fractions of the gasoline and more specifically in the fraction, the boiling point of which is less than 120° C.

It should be noted that the sulfur compounds present in the gasoline can also comprise heterocyclic sulfur compounds, such as, for example, thiophenes, alkylthiophenes or benzothiophenes. These heterocyclic compounds, unlike mercaptans, cannot be removed by extractive processes. These sulfur compounds are consequently removed by a hydrotreating, which leads to their transformation into hydrocarbons and $H_2S$.

Preferably, the gasoline treated by the process according to the invention is a heavy gasoline (or HCN for Heavy Cracked Naphtha) resulting from a distillation stage aimed at separating a broad cut of the gasoline resulting from a cracking process (or FRCN for Full Range Cracked Naphtha) into a light gasoline (LCN for Light Cracked Naphtha) and a heavy gasoline HCN. The cut point of the light gasoline and of the heavy gasoline is determined in order to limit the sulfur content of the light gasoline and to make it possible to use it in the gasoline pool, preferably without additional post-treatment. Advantageously, the broad cut FRCN is subjected to a selective hydrogenation stage described below before the distillation stage.

The Rejuvenated Catalyst

The rejuvenated catalyst results from an at least partially spent catalyst, itself resulting from a fresh catalyst, which has been used in a hydrotreating process for a certain period of time and which exhibits a significantly lower activity than the fresh catalyst, which necessitates its replacement. The at least partially spent catalyst is, as a first step, regenerated, then rejuvenated by adding at least one organic compound containing oxygen and/or nitrogen and/or sulfur, then dried.

The rejuvenated catalyst can result from a hydrotreating of any petroleum cut, such as a naphtha, kerosene, gas oil, vacuum distillate or residue cut. Hydrotreating is understood to mean reactions encompassing in particular hydrodesulfurization (HDS), hydrodenitrogenation (HDN) and hydrogenation of aromatics (HOA). It can also result from a hydrotreating of biomass or bio-oils.

Preferably, the rejuvenated catalyst results from a process for the hydrodesulfurization of a sulfur-containing olefinic gasoline cut, carried out under the conditions as described below.

The rejuvenated catalyst comprises at least one metal from group VIII, at least one metal from group VIb, an oxide support and an organic compound containing oxygen and/or nitrogen and/or sulfur as described below, and optionally phosphorus. According to another alternative form, the rejuvenated catalyst does not comprise phosphorus.

The metal from group VIb present in the active phase of the rejuvenated catalyst is preferentially chosen from molybdenum and tungsten. The metal from group VIII present in the active phase of the rejuvenated catalyst is preferentially chosen from cobalt, nickel and the mixture of these two elements. The active phase of the rejuvenated catalyst is preferably chosen from the group formed by the combination of the elements nickel-molybdenum, cobalt-molybdenum and nickel-cobalt-molybdenum and very preferably the active phase consists of cobalt and molybdenum.

The content of metal from group VIII is between 0.1% and 10% by weight of oxide of the metal from group VIII, with respect to the total weight of the rejuvenated catalyst, preferably of between 0.6% and 8% by weight, preferably of between 2% and 7%, very preferably of between 2% and 6% by weight and more preferably still of between 2.5% and 6% by weight.

The content of metal from group VIb is between 1% and 40% by weight of oxide of the metal from group VIb, with respect to the total weight of the rejuvenated catalyst, preferably of between 1% and 25% by weight, very preferably of between 2% and 18% by weight.

The metal from group VIII to metal from group VIb molar ratio of the rejuvenated catalyst is generally between 0.1 and 0.8, preferably between 0.2 and 0.6.

In addition, the rejuvenated catalyst exhibits a density of metal from group VIb, expressed as number of atoms of said metal per unit area of the rejuvenated catalyst, which is between 0.5 and 30 atoms of metal from group VIb per $nm^2$ of rejuvenated catalyst, preferably between 2 and 25 and more preferably still between 3 and 15. The density of metal from group VIb, expressed as number of atoms of metal from group VIb per unit area of the rejuvenated catalyst (number of atoms of metal from group VIb per $nm^2$ of rejuvenated catalyst), is calculated, for example, from the following relationship:

$$d(\text{métal du groupe } VIB) = \frac{(X \times N_A)}{(100 \times 10^{18} \times S \times M_M)}$$

with:

X=% by weight of metal from group VIb;

$N_A$=Avogadro's number, equal to 6.022×10²³;

S=Specific surface of the catalyst (m²/g), measured according to the standard ASTM D3663;

$M_M$=Molar mass of the metal from group VIb (for example 95.94 g/mol for molybdenum).

For example, if the catalyst contains 20% by weight of molybdenum oxide MoO₃ (i.e. 13.33% by weight of Mo) and has a specific surface of 100 m²/g, the density d(Mo) is equal to:

$$d\ Mo = \frac{(13.33 \times N_A)}{(100 \times 10^{18} \times 100 \times 96)} = 8.4 \text{ atoms of } Mo/nm^2 \text{ of catalyst}$$

Optionally, the rejuvenated catalyst can additionally exhibit a phosphorus content generally of between 0.3% and 10% by weight of $P_2O_5$, with respect to the total weight of rejuvenated catalyst, preferably between 0.5% and 5% by weight and very preferably between 1% and 3% by weight. Furthermore, the phosphorus/(metal from group VIb) molar ratio is generally between 0.1 and 0.7, preferably between 0.2 and 0.6, when phosphorus is present.

The contents of metal from group VIb, of metal from group VIII and of phosphorus in the fresh, at least partially spent, regenerated or rejuvenated catalyst are expressed as oxides after correction for the loss on ignition of the catalyst sample in a muffle furnace at 550° C. for two hours. The loss on ignition is due to the loss of moisture, carbon, sulfur and/or other contaminants. It is determined according to ASTM D7348.

Preferably, the rejuvenated catalyst is characterized by a specific surface of between 5 and 400 m²/g, preferably of between 10 and 250 m²/g, preferably of between 20 and 200 m²/g, very preferably of between 30 and 180 m²/g. The specific surface is determined in the present invention by the BET method according to the standard ASTM D3663, as described in the work by Rouquerol F., Rouquerol J. and Singh K., *Adsorption by Powders & Porous Solids: Principle, Methodology and Applications*, Academic Press, 1999, for example by means of an Autopore III™ model device of the Micromeritics™ brand.

The pore volume of the rejuvenated catalyst is generally between 0.4 cm³/g and 1.3 cm³/g, preferably between 0.6 cm³/g and 1.1 cm³/g. The total pore volume is measured by mercury porosimetry according to the standard ASTM D4284 with a wetting angle of 140°, as described in the same work.

The tapped bulk density (TBD) of the rejuvenated catalyst is generally between 0.4 and 0.7 g/ml, preferably between 0.45 and 0.69 g/ml. The TBD measurement consists in introducing the catalyst into a measuring cylinder, the volume of which has been determined beforehand, and then, by vibration, in tapping it until a constant volume is obtained. The bulk density of the tapped product is calculated by comparing the mass introduced and the volume occupied after tapping.

The catalyst can be in the form of cylindrical or multilobe (trilobe, quadrilobe, and the like) extrudates with a small diameter, or of spheres.

The oxide support of the rejuvenated catalyst is usually a porous solid chosen from the group consisting of: aluminas, silica, silica-aluminas and also titanium and magnesium oxides, used alone or as a mixture with alumina or silica-alumina. It is preferably chosen from the group consisting of silica, the family of the transition aluminas and silica-aluminas; very preferably, the support is constituted essentially of at least one transition alumina, that is to say that it comprises at least 51% by weight, preferably at least 60% by weight, very preferably at least 80% by weight, indeed even at least 90% by weight, of transition alumina. It preferably consists solely of a transition alumina. Preferably, the support of the catalyst is a "high temperature" transition alumina, that is to say which contains theta-, delta-, kappa- or alpha-phase aluminas, alone or as a mixture, and an amount of less than 20% of gamma-, chi- or eta-phase alumina.

The rejuvenated catalyst also contains contaminants resulting from the feedstock, such as carbon, sulfur and other contaminants, such as silicon, arsenic and chlorine.

The rejuvenated catalyst contains residual carbon at a content preferably of less than 2% by weight, preferably of between 0.1% and 1.9% by weight, with respect to the total weight of the rejuvenated catalyst, preferentially of between 0.1% and 1.5% by weight and particularly preferably between 0.1% and 1.0% by weight. The rejuvenated catalyst may also not contain residual carbon.

It should be noted that the term "residual carbon" in the present patent application means carbon (coke) remaining in the rejuvenated catalyst which was already present after regeneration of the at least partially spent catalyst. This residual carbon content in the regenerated catalyst is measured by elemental analysis according to ASTM D5373.

The rejuvenated catalyst contains residual sulfur (before the optional sulfidation) at a content of less than 5% by weight, preferably of between 0.1% and 4.9% by weight, with respect to the total weight of the rejuvenated catalyst, preferentially of between 0.1% and 2.0% by weight and particularly preferably between 0.2% and 0.8% by weight. The rejuvenated catalyst may also not contain residual sulfur.

This residual sulfur content in the rejuvenated catalyst is measured by elemental analysis according to ASTM D5373.

Optionally, the rejuvenated catalyst can additionally exhibit a low content of contaminants resulting from the feedstock treated by the fresh catalyst from which it originates, such as silicon, arsenic or chlorine.

Preferably, the content of silicon (besides that possibly present on the fresh catalyst) is less than 2% by weight and very preferably less than 1% by weight, with respect to the total weight of the rejuvenated catalyst.

Preferably, the arsenic content is less than 2000 ppm by weight and very preferably less than 500 ppm by weight, with respect to the total weight of the rejuvenated catalyst.

Preferably, the chlorine content is less than 2000 ppm by weight and very preferably less than 500 ppm by weight, with respect to the total weight of the rejuvenated catalyst.

The rejuvenated catalyst also contains an organic compound containing oxygen and/or nitrogen and/or sulfur. Generally, the organic compound is chosen from a compound comprising one or more chemical functional groups chosen from a carboxylic, alcohol, thiol, thioether, sulfone, sulfoxide, ether, aldehyde, ketone, ester, carbonate, amine, nitrile, imide, oxime, urea and amide functional group or also compounds including a furan ring or also sugars.

The oxygen-containing organic compound can be one or more chosen from compounds comprising one or more chemical functional groups chosen from a carboxylic, alcohol, ether, aldehyde, ketone, ester or carbonate functional group or also compounds including a furan ring or also sugars. By way of example, the oxygen-containing organic compound can be one or more chosen from the group consisting of ethylene glycol, diethylene glycol, triethylene glycol, a polyethylene glycol (with a molecular weight of between 200 and 1500 g/mol), propylene glycol, 2-butoxyethanol, 2-(2-butoxyethoxy)ethanol, 2-(2-methoxyethoxy) ethanol, triethylene glycol dimethyl ether, glycerol, acetophenone, 2,4-pentanedione, pentanone, acetic acid, maleic acid, malic acid, malonic acid, oxalic acid, gluconic acid, tartaric acid, citric acid, γ-ketovaleric acid, a di($C_1$-$C_4$ alkyl) succinate and more particularly dimethyl succinate, methyl acetoacetate, ethyl acetoacetate, 2-methoxyethyl 3-oxobutanoate, 2-methacryloyloxyethyl 3-oxobutanoate, dibenzofuran, a crown ether, orthophthalic acid, glucose, fructose, sucrose, sorbitol, xylitol, γ-valerolactone, 2-acetylbutyrolactone, propylene carbonate, 2-furaldehyde (also known as furfural), 5-hydroxymethylfurfural (also known under the name 5-(hydroxymethyl)-2-furaldehyde or 5-HMF), 2-acetylfuran, 5-methyl-2-furaldehyde, methyl 2-furoate, furfuryl alcohol (also known under the name furfuranol), furfuryl acetate, ascorbic acid, butyl lactate, butyl butyryllactate, ethyl 3-hydroxybutanoate, ethyl 3-ethoxypropanoate, methyl 3-methoxypropanoate, 2-ethoxyethyl acetate, 2-butoxyethyl acetate, 2-hydroxyethyl acrylate, 2-hydroxyethyl methacrylate and 5-methyl-2(3H)-furanone.

The nitrogen-containing organic compound can be one or more chosen from compounds comprising one or more chemical functional groups chosen from an amine or nitrile functional group. By way of example, the nitrogen-containing organic compound can be one or more chosen from the group consisting of ethylenediamine, diethylenetriamine, hexamethylenediamine, triethylenetetramine, tetraethylenepentamine, pentaethylenehexamine, acetonitrile, octylamine, guanidine and a carbazole.

The organic compound containing oxygen and nitrogen can be one or more chosen from compounds comprising one or more chemical functional groups chosen from a carboxylic acid, alcohol, ether, aldehyde, ketone, ester, carbonate, amine, nitrile, imide, amide, urea or oxime functional group. By way of example, the organic compound containing oxygen and nitrogen can be one or more choose from the group consisting of 1,2-cyclohexanediaminetetraacetic acid, monoethanolamine (MEA), 1-methyl-2-pyrrolidinone, dimethylformamide, ethylenediaminetetraacetic acid (EDTA), alanine, glycine, nitrilotriacetic acid (NTA), N-(2-hydroxyethyl)ethylenediamine-N,N',N'-triacetic acid (HEDTA), diethylenetriaminepentaacetic acid (DTPA), tetramethylurea, glutamic acid, dimethylglyoxime, bicine, tricine, 2-methoxyethyl cyanoacetate, 1-ethyl-2-pyrrolidinone, 1-vinyl-2-pyrrolidinone, 1,3-dimethyl-2-imidazolidinone, 1-(2-hydroxyethyl)-2-pyrrolidinone, 1-(2-hydroxyethyl)-2,5-pyrrolidinedione, 1-methyl-2-piperidinone, 1-acetyl-2-azepanone, 1-vinyl-2-azepanone and 4-aminobutanoic acid.

The sulfur-containing organic compound can be one or more chosen from compounds comprising one or more chemical functional groups chosen from a thiol, thioether, sulfone or sulfoxide functional group. By way of example, the sulfur-containing organic compound can be one or more chosen from the group consisting of thioglycolic acid, 2,2'-thiodiethanol, 2-hydroxy-4-methylthiobutanoic acid, a sulfone derivative of a benzothiophene or a sulfoxide derivative of a benzothiophene, methyl 3-(methylthio)propanoate and ethyl 3-(methylthio)propanoate.

Preferably, the organic compound contains oxygen; preferably, it is chosen from γ-valerolactone, 2-acetylbutyrolactone, triethylene glycol, diethylene glycol, ethylene glycol, ethylenediaminetetraacetic acid (EDTA), maleic acid, malonic acid, citric acid, gluconic acid, dimethyl succinate, glucose, fructose, sucrose, sorbitol, xylitol, γ-ketovaleric acid, dimethylformamide, 1-methyl-2-pyrrolidinone, propylene carbonate, 2-methoxyethyl 3-oxobutanoate, bicine, tricine, 2-furaldehyde (also known under the name furfural), 5-hydroxymethylfurfural (also known under the name 5-(hydroxymethyl)-2-furaldehyde or 5-HMF), 2-acetylfuran, 5-methyl-2-furaldehyde, ascorbic acid, butyl lactate, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1-(2-hydroxyethyl)-2-pyrrolidinone, 1-(2-hydroxyethyl)-2,5-pyrrolidinedione, 5-methyl-2(3H)-furanone, 1-methyl-2-piperidinone and 4-aminobutanoic acid.

The content of organic compound(s) containing oxygen and/or nitrogen and/or sulfur on the rejuvenated catalyst is between 1% and 30% by weight, preferably between 1.5% and 25% by weight and more preferably between 2% and 20% by weight, with respect to the total weight of the rejuvenated catalyst.

Process for the Preparation of the Rejuvenated Catalyst

The rejuvenated catalyst results from an at least partially spent catalyst, itself resulting from a fresh catalyst. More particularly, the rejuvenated catalyst is prepared from an at least partially spent catalyst resulting from a hydrotreating process and preferably resulting from a process for the hydrodesulfurization of a sulfur-containing olefinic gasoline cut. The at least partially spent catalyst comprises at least one metal from group VIII, at least one metal from group VIb, an oxide support, and optionally phosphorus, said rejuvenation process comprising the following stages:

a) the at least partially spent catalyst is regenerated in an oxygen-containing gas stream at a temperature of between 350° C. and 550° C., so as to obtain a regenerated catalyst, b) at least one organic compound containing oxygen and/or nitrogen and/or sulfur is brought into contact with the regenerated catalyst, c) a drying stage is carried out at a temperature of less than 200° C., without subsequent calcination, so as to obtain a rejuvenated catalyst.

It is important to emphasize that the rejuvenated catalyst, during its process of preparation, does not undergo calcination after the introduction of the organic compound containing oxygen and/or nitrogen and/or sulfur in order to preserve, at least in part, the organic compound in the catalyst. Calcination is understood here to mean a heat treatment under a gas containing air or oxygen at a temperature of greater than or equal to 200° C.

In addition, during stage b), no addition of a compound of a metal from group VIb or of a compound of a metal from group VIII or also of phosphorus is carried out on the regenerated catalyst.

The preparation of the fresh catalyst is known and generally comprises a stage of impregnation of the metals from group VIII and from group VIb and optionally of phosphorus and/or of an organic compound on the oxide support, followed by a drying operation, then by an optional calcination making it possible to obtain the active phase in their oxide forms. Before its use in a process for the hydrodesulfurization of a sulfur-containing olefinic gasoline cut, the fresh catalyst is generally subjected to a sulfidation in order to form the active entity as described below.

According to an alternative form of the invention, the fresh catalyst has not undergone calcination during its preparation, that is to say that the impregnated catalytic precursor has not been subjected to a stage of heat treatment at a temperature of greater than 200° C. under an inert atmosphere or under an oxygen-containing atmosphere, in the presence or absence of water.

According to another alternative form of the invention, which is preferred, the fresh catalyst has undergone a calcination stage during its preparation, that is to say that the impregnated catalytic precursor has been subjected to a stage of heat treatment at a temperature of between 200° C. and 1000° C. and preferably between 250° C. and 750° C., for a period of time typically of between 15 minutes and 10 hours, under an inert atmosphere or under an oxygen-containing atmosphere, in the presence or absence of water. This is because it has been noticed that a rejuvenated catalyst resulting from a fresh catalyst which has undergone a calcination stage during its preparation shows a less pronounced fall in activity than a rejuvenated catalyst resulting from a fresh catalyst which has not undergone a calcination stage during its preparation.

The preparation of the rejuvenated catalyst comprises a stage a) of removal of the coke and of the sulfur (regeneration stage). This is because, according to stage a), the at least partially spent catalyst is regenerated in an oxygen-containing gas stream at a temperature of between 350° C. and 550° C., so as to obtain a regenerated catalyst.

Even if this is possible, the regeneration is preferably not carried out by keeping the laden catalyst in the hydrotreating reactor (in situ regeneration). Preferably, the at least partially spent catalyst is thus extracted from the reactor and sent to a regeneration plant in order to carry out the regeneration in said plant (ex situ regeneration).

The regeneration stage a) is preferably preceded by a deoiling stage. The deoiling stage generally comprises bringing the at least partially spent catalyst into contact with a stream of inert gas (that is to say essentially devoid of oxygen), for example in a nitrogen atmosphere or the like, at a temperature of between 300° C. and 400° C., preferably of between 300° C. and 350° C. The inert gas flow rate in terms of flow rate per unit volume of the catalyst is from 5 to 150 $Sl \cdot l^{-1} \cdot h^{-1}$ for 3 to 7 hours.

In an alternative form, the deoiling stage can be carried out by light hydrocarbons, by steam treatment or any other analogous process.

The deoiling stage makes it possible to remove the soluble hydrocarbons and thus to release the porosity of the at least partially spent catalyst necessary for the rejuvenation.

The regeneration stage a) is generally carried out in a gas stream containing oxygen, generally air. The water content is generally between 0% and 50% by weight. The gas flow rate in terms of flow rate per unit volume of the at least partially spent catalyst is preferably from 20 to 2000 $Sl \cdot l^{-1} \cdot h^{-1}$, more preferably from 30 to 1000 $Sl \cdot l^{-1} \cdot h^{-1}$ and particularly preferably from 40 to 500 $Sl \cdot l^{-1} \cdot h^{-1}$. The duration of the regeneration is preferably 2 hours or more, more preferably 2.5 hours or more and particularly preferably 3 hours or more. The regeneration of the at least partially spent catalyst is generally carried out at a temperature of between 350° C. and 550° C., preferably of between 360° C. and 500° C.

After the regeneration stage, the regenerated catalyst intended to be used in the hydrodesulfurization process according to the invention is subjected to a rejuvenation stage b) according to which at least one organic compound containing oxygen and/or nitrogen and/or sulfur as described above is brought into contact with the regenerated catalyst. The function of the organic compounds is to increase the catalytic activity in comparison with the non-additivated catalysts.

In this case, the molar ratio of the organic compound added per metal from group VIb already present in the regenerated catalyst is between 0.01 and 5 mol/mol, preferably between 0.05 and 3 mol/mol, in a preferred way between 0.05 and 2 mol/mol and very preferably between 0.1 and 1.5 mol/mol.

When several organic compounds are present, the different molar ratios apply for each of the organic compounds present.

Stage b) of bringing said regenerated catalyst into contact with an impregnation solution containing a compound comprising an organic compound containing oxygen and/or nitrogen and/or sulfur can be carried out either by slurry impregnation, or by excess impregnation, or by dry impregnation, or by any other means known to a person skilled in the art.

Equilibrium (or excess) impregnation consists in immersing the support or the catalyst in a volume of solution (often considerably) greater than the pore volume of the support or of the catalyst while keeping the system stirred in order to improve the exchanges between the solution and the support or catalyst. An equilibrium is finally reached after diffusion of the different entities into the pores of the support or catalyst. Control of the amount of elements deposited is provided by the prior measurement of an adsorption isotherm which relates the concentration of the elements to be deposited contained in the solution to the amount of the elements deposited on the solid in equilibrium with this solution.

Dry impregnation consists, for its part, in introducing a volume of impregnation solution equal to the pore volume of the support or of the catalyst. Dry impregnation makes it possible to deposit, on a given support or catalyst, all of the additives contained in the impregnation solution.

Stage b) can advantageously be carried out by one or more excess impregnations of solution or preferably by one or more dry impregnations and very preferably by a single dry impregnation of said regenerated catalyst, using the impregnation solution.

Said organic compound is preferentially impregnated on said catalyst after dissolution in aqueous solution.

Preferably, the impregnation solution consists of the solvent and of the organic compound(s).

No addition of compound of metal from group VIb and/or of metal from group VIII and/or of phosphorus is carried out during stage b) of bringing said regenerated catalyst into contact with an impregnation solution containing a compound comprising an organic compound containing oxygen and/or nitrogen and/or sulfur.

The impregnation solution can comprise any polar solvent known to a person skilled in the art. Said polar solvent used is advantageously chosen from the group formed by methanol, ethanol, water, phenol and cyclohexanol, taken alone or as a mixture. Said polar solvent can also advantageously be chosen from the group formed by propylene carbonate, DMSO (dimethyl sulfoxide), N-methylpyrrolidone (NMP) and sulfolane, taken alone or as a mixture. Preferably, a polar protic solvent is used. A list of the common polar solvents and also their dielectric constants can be found in the book *Solvents and Solvent Effects in Organic Chemistry*, C. Reichardt, Wiley-VCH, 3rd edition, 2003, pages 472-474. Very preferably, the solvent used is water or ethanol and particularly preferably the solvent is water. In one possible embodiment, the solvent can be absent from the impregnation solution.

Advantageously, after each impregnation stage, the impregnated support is left to mature.

Maturation makes it possible for the impregnation solution to disperse homogeneously within the support.

Any maturation stage is advantageously carried out at atmospheric pressure, in a water-saturated atmosphere and at a temperature of between 17° C. and 50° C., and preferably at ambient temperature. Generally, a maturation time of between ten minutes and forty-eight hours and preferably of between thirty minutes and six hours is sufficient.

After the rejuvenation stage, the rejuvenated catalyst is subjected to a drying stage at a temperature of less than 200° C., advantageously of between 50° C. and 180° C., preferably between 70° C. and 150° C., very preferably between 75° C. and 130° C.

The drying stage is preferentially carried out under an inert atmosphere or under an oxygen-containing atmosphere. The drying stage can be carried out by any technique known to a person skilled in the art. It is advantageously carried out at atmospheric pressure or at reduced pressure. Preferably, this stage is carried out at atmospheric pressure. It is advantageously carried out in a traversed bed using hot air or any other hot gas. Preferably, when the drying is carried out in a fixed bed, the gas used is either air or an inert gas, such as argon or nitrogen. Very preferably, the drying is carried out in a traversed bed in the presence of nitrogen and/or air. Preferably, the drying stage has a duration of between 5 minutes and 15 hours, preferably between 30 minutes and 12 hours.

According to a first alternative form, the drying is carried out so as to preferably retain at least 30% by weight of the organic compound introduced during an impregnation stage; preferably, this amount is greater than 50% by weight and more preferably still greater than 70% by weight, calculated on the basis of the carbon remaining on the rejuvenated catalyst.

On conclusion of the drying stage, a rejuvenated catalyst is then obtained, which catalyst will be subjected to an optional activation (sulfidation) stage for its subsequent use in a process for the hydrodesulfurization of gasolines.

Before bringing into contact with the feedstock to be treated in the process for the hydrodesulfurization of gasolines according to the invention, the rejuvenated catalyst generally undergoes a sulfidation stage. The sulfidation is preferably carried out in a sulforeducing medium, that is to say in the presence of $H_2S$ and hydrogen, in order to transform metal oxides into sulfides, such as, for example, $MoS2$ and $Co_9S_8$. The sulfidation is carried out by injecting, onto the catalyst, a stream containing $H_2S$ and hydrogen, or else a sulfur compound capable of decomposing to give $H_2S$ in the presence of the catalyst and of hydrogen. Polysulfides, such as dimethyl disulfide (DMDS), are $H_2S$ precursors commonly used to sulfide catalysts. The sulfur can also originate from the feedstock. The temperature is adjusted in order for the $H_2S$ to react with the metal oxides to form metal sulfides. This sulfidation can be carried out in situ or ex situ (inside or outside the reactor) of the reactor of the process according to the invention at temperatures of between 200° C. and 600° C. and more preferentially between 300° C. and 500° C.

The hydrodesulfurization process according to the invention consists in bringing the sulfur-containing olefinic gasoline cut into contact with the rejuvenated catalyst and hydrogen under the following conditions:

- a temperature of between 200° C. and 400° C., preferably of between 230° C. and 330° C.
- at a total pressure of between 1 and 3 MPa, preferably of between 1.5 and 2.5 MPa
- an hourly space velocity (HSV), defined as being the flow rate by volume of feedstock relative to the volume of catalyst, of between 1 and 10 $h^{-1}$, preferably of between 2 and 6 $h^{-1}$
- a hydrogen/gasoline feedstock ratio by volume of between 100 and 1200 Sl/l, preferably of between 150 and 400 Sl/l.

The hydrodesulfurization process according to the invention is carried out in the presence of a rejuvenated catalyst. It can also be carried out in the presence of a mixture of a rejuvenated catalyst and of a fresh catalyst or of a regenerated catalyst.

When the fresh or regenerated catalyst is present, it comprises at least one metal from group VIII, at least one metal from group VIb and an oxide support, and optionally phosphorus and/or an organic compound such as are described above.

The active phase and the support of the fresh or regenerated catalyst may or may not be identical to the active phase and to the support of the rejuvenated catalyst.

The active phase and the support of the fresh catalyst may or may not be identical to the active phase and to the support of the regenerated catalyst.

When the hydrodesulfurization process is carried out in the presence of a rejuvenated catalyst and of a fresh or regenerated catalyst, it can be carried out in a reactor of the fixed bed type containing several catalytic beds.

In this case, and according to a first alternative form, a catalytic bed containing the fresh or regenerated catalyst can precede a catalytic bed containing the rejuvenated catalyst in the direction of the circulation of the feedstock.

In this case, and according to a second alternative form, a catalytic bed containing the rejuvenated catalyst can precede a catalytic bed containing the fresh or regenerated catalyst in the direction of the circulation of the feedstock.

In this case, and according to a third alternative form, a catalytic bed can contain a mixture of a rejuvenated catalyst and of a fresh catalyst and/or of a regenerated catalyst.

In these cases, the operating conditions are those described above. They are generally identical in the different catalytic beds except for the temperature, which generally increases in a catalytic bed following the exothermicity of the hydrodesulfurization reactions.

When the hydrodesulfurization process is carried out in the presence of a rejuvenated catalyst and of a fresh or regenerated catalyst in several reactors in series of the fixed bed type or of the ebullated bed type, one reactor can comprise a rejuvenated catalyst while another reactor can comprise a fresh or regenerated catalyst, or a mixture of a rejuvenated catalyst and of a fresh and/or regenerated catalyst, and this in any order. It is possible to provide a device for the removal of the $H_2S$ from the effluent resulting from the first hydrodesulfurization reactor before treating said effluent in the second hydrodesulfurization reactor. In these cases, the operating conditions are those described above and may or may not be identical in the different reactors.

Selective Hydrogenation (Optional Stage)

According to one alternative form, the gasoline cut is subjected to a selective hydrogenation stage before the hydrodesulfurization process according to the invention.

Preferably, the gasoline treated by the hydrodesulfurization process according to the invention is a heavy gasoline resulting from a distillation stage aimed at separating a broad cut of the gasoline resulting from a cracking process (or FRCN for Full Range Cracked Naphtha) into a light gasoline and a heavy gasoline.

Advantageously, the broad cut FRCN is subjected to a selective hydrogenation stage described below before the distillation stage.

Said FRCN cut is treated beforehand in the presence of hydrogen and of a selective hydrogenation catalyst so as to at least partially hydrogenate the diolefins and to carry out a reaction for increasing the molecular weight of a part of the mercaptan (RSH) compounds present in the feedstock to give thioethers, by reaction with olefins.

To this end, the broad FRCN cut is sent to a selective hydrogenation catalytic reactor containing at least one fixed or moving bed of catalyst for the selective hydrogenation of the diolefins and for increasing the molecular weight of the mercaptans. The reaction for the selective hydrogenation of the diolefins and for increasing the molecular weight of the mercaptans is preferentially carried out on a sulfided catalyst comprising at least one element from group VIII and optionally at least one element from group VIb and an oxide support. The element from group VIII is preferably chosen from nickel and cobalt and in particular nickel. The element from group VIb, when it is present, is preferably chosen from molybdenum and tungsten and very preferably molybdenum.

The oxide support of the catalyst is preferably chosen from alumina, nickel aluminate, silica, silicon carbide or a mixture of these oxides. Use is preferably made of alumina and more preferably still of high-purity alumina. According to a preferred embodiment, the selective hydrogenation catalyst contains nickel at a content by weight of nickel oxide (in NiO form) of between 1% and 12%, and molybdenum at a content by weight of molybdenum oxide (in $MoO_3$ form) of between 6% and 18% and a nickel/molybdenum molar ratio of between 0.3 and 2.5, the metals being deposited on a support consisting of alumina and for which the degree of sulfidation of the metals constituting the catalyst being greater than 50%.

During the optional selective hydrogenation stage, gasoline is brought into contact with the catalyst at a temperature of between 50° C. and 250° C., preferably between 80° C. and 220° C. and more preferably still between 90° C. and 200° C., with a liquid space velocity (LHSV) of between 0.5 $h^{-1}$ and 20 $h^{-1}$, the unit of the liquid space velocity being the liter of feedstock per liter of catalyst and per hour (l/l·h). The pressure is between 0.4 MPa and 5 MPa, preferably between 0.6 and 4 MPa and more preferably still between 1 and 2 MPa. The optional selective hydrogenation stage is typically carried out with a Fh/gasoline feedstock ratio of between 2 and 100 $Sm^3$ of hydrogen per $m^3$ of feedstock, preferably between 3 and 30 $Sm^3$ of hydrogen per $m^3$ of feedstock.

EXAMPLES

Example 1—Preparation of a Regenerated Catalyst A (Comparative)

The support of the fresh catalyst is a transition alumina with a specific surface of 140 $m^2/g$ and a pore volume of 1.0 $cm^3/g$. The fresh catalyst is prepared by dry impregnation of the support with an aqueous solution of ammonium heptamolybdate and of cobalt nitrate, the volume of the solution containing the precursors of the metals being strictly equal to the pore volume of the mass of support. The concentration of the metal precursors in aqueous solution is adjusted so as to obtain the desired percentage by weight of molybdenum and cobalt on the final catalyst. After dry impregnation on the support, the catalyst is left to mature for 1 h 30 in a water-saturated chamber, dried under air in an oven at 90° C. for 12 hours and then calcined under air at 450° C. for 2 hours.

The fresh catalyst obtained after calcination has a content of 7.4% by weight of molybdenum ($MoO_3$ equivalent) and 2.0% by weight of cobalt (CoO equivalent). This catalyst exhibits a Co/Mo atomic ratio of 0.52.

The fresh catalyst is used to desulfurize a catalytic cracking (FCC) gasoline, the characteristics of which are collated in table 1. The reaction is carried out at 270° C. for 900 hours in a reactor of traversed bed type under the following conditions: P=2 MPa, HSV=4 $h^{-1}$, $H_2$/HC=300 liters/liters of hydrocarbon feedstock. The catalyst is pretreated at 350° C. with a feedstock containing 4% by weight of sulfur in the DMDS (dimethyl disulfide) form in order to provide the sulfidation of the oxide phases. The reaction takes place in an upward stream in an isothermal pilot reactor.

TABLE 1

| Characteristics of the FCC gasoline cut used for the aging of the fresh catalyst. | |
|---|---|
| Aromatics wt % | 41.3 |
| Paraffins wt % | 27.2 |
| Naphthenics wt % | 11.0 |
| Olefins wt % | 20.5 |
| T5° C. | 62 |
| T95° C. | 225 |

The spent catalyst is withdrawn from the reactor on conclusion of the hydrodesulfurization of a catalytic cracking (FCC) gasoline described above. The spent catalyst is subsequently washed with toluene in a Soxhlet at 250° C. for 7 hours.

The regeneration of the spent/washed catalyst is subsequently carried out in a tubular oven under dry air at 450° C. for 2 hours and the regenerated catalyst A is obtained. The residual carbon content of catalyst A is zero.

Example 2—Preparation of a Regenerated Catalyst B (Comparative)

The support of the catalyst B is a transition alumina with a specific surface of 205 $m^2/g$ and a pore volume of 0.8 $cm^3/g$. The fresh catalyst is prepared by dry impregnation of the support with an aqueous solution of molybdenum oxide, of cobalt hydroxide and of orthophosphoric acid, the volume of the solution containing the precursors of the metals being strictly equal to the pore volume of the mass of support. The concentration of the metal precursors in aqueous solution is adjusted so as to obtain the desired percentage by weight of molybdenum, cobalt and phosphorus on the final catalyst. After dry impregnation on the support, the catalyst is left to mature for 1 h 30 in a water-saturated chamber, dried under air in an oven at 90° C. for 12 hours and then calcined under air at 450° C. for 2 hours.

The fresh catalyst obtained after calcination has a content of 15.2% by weight of molybdenum ($MoO_3$ equivalent), 2.9% by weight of cobalt (CoO equivalent) and 2.5% by weight of phosphorus ($P_2O_5$ equivalent). This catalyst exhibits a Co/Mo atomic ratio of 0.37 and a P/Mo atomic ratio of 0.33.

The fresh catalyst is used to desulfurize a catalytic cracking (FCC) gasoline, the characteristics of which are collated in table 1. The reaction is carried out at 270° C. for 900 hours in a reactor of traversed bed type under the following conditions: P=2 MPa, HSV=4 h$^{-1}$, H$_2$/HC=300 liters/liters of hydrocarbon feedstock. The catalyst is pretreated at 350° C. with a feedstock containing 4% by weight of sulfur in the DMDS (dimethyl disulfide) form in order to provide the sulfidation of the oxide phases. The reaction takes place in an upward stream in an isothermal pilot reactor.

The spent catalyst is withdrawn from the reactor on conclusion of the hydrodesulfurization of a catalytic cracking (FCC) gasoline described above. The spent catalyst is subsequently washed with toluene in a Soxhlet at 250° C. for 7 hours (deoiling).

The regeneration of the spent/washed catalyst is subsequently carried out in a tubular oven under dry air at 450° C. for 2 hours and the regenerated catalyst B is obtained. The residual carbon content of the regenerated catalyst B is 0.3% by weight.

Example 3—Preparation of Rejuvenated Catalysts A1 and A2 by Addition of Citric Acid (According to the Invention)

The catalyst A1 is prepared by dry impregnation of the regenerated catalyst A with an aqueous citric acid solution, the volume of the solution being strictly equal to the pore volume of the mass of the catalyst A. The concentration of citric acid in aqueous solution is adjusted so as to obtain a molar ratio of citric acid to molybdenum already present on the regenerated catalyst A of 0.2 mol/mol. After dry impregnation on the regenerated catalyst A, the catalyst A1 is left to mature for 1 h 30 in a water-saturated chamber and dried under air in an oven at 90° C. for 12 hours.

The catalyst A2 is obtained in a similar way but by using an aqueous citric acid solution, the concentration of which is adjusted so as to obtain a molar ratio of citric acid to molybdenum already present on the regenerated catalyst A of 1.

Example 4—Preparation of a Rejuvenated Catalyst A3 by Addition of Ascorbic Acid (According to the Invention)

The catalyst A3 is prepared by dry impregnation of the regenerated catalyst A with an aqueous ascorbic acid solution, the volume of the solution being strictly equal to the pore volume of the mass of the regenerated catalyst A. The concentration of ascorbic acid in aqueous solution is adjusted so as to obtain a molar ratio of ascorbic acid to molybdenum already present on the regenerated catalyst A of 0.8 mol/mol. After dry impregnation on the regenerated catalyst A, the catalyst A3 is left to mature for 1 h 30 in a water-saturated chamber and dried under air in an oven at 120° C. for 12 hours.

Example 5—Preparation of a Rejuvenated Catalyst A4 by Addition of Triethylene Glycol (According to the Invention)

The catalyst A4 is prepared by dry impregnation of the regenerated catalyst A with an aqueous triethylene glycol solution, the volume of the solution being strictly equal to the pore volume of the mass of the regenerated catalyst A. The concentration of triethylene glycol in aqueous solution is adjusted so as to obtain a molar ratio of triethylene glycol to molybdenum already present on the regenerated catalyst A of 0.6 mol/mol. After dry impregnation on the regenerated catalyst A, the catalyst A4 is left to mature for 1 h 30 in a water-saturated chamber and dried under air in an oven at 160° C. for 12 hours.

Example 6—Preparation of a Rejuvenated Catalyst A5 by Addition of Citric Acid and Addition of Urea (According to the Invention)

The catalyst A5 is prepared by dry impregnation of the regenerated catalyst A with an aqueous solution of citric acid and of urea, the volume of the solution being strictly equal to the pore volume of the mass of the regenerated catalyst A. The concentrations of citric acid and of urea in aqueous solution are adjusted so as to obtain respective ratios of the moles of citric acid and of urea to moles of molybdenum which are already present on the regenerated catalyst A of 0.3 and 1.5. After dry impregnation on the regenerated catalyst A, the catalyst A5 is left to mature for 1 h 30 in a water-saturated chamber and dried under air in an oven at 110° C. for 12 hours.

Example 7—Preparation of a Rejuvenated Catalyst B1 by Addition of Diethanolamine (According to the Invention)

The catalyst B1 is prepared by dry impregnation of the regenerated catalyst B with an aqueous diethanolamine solution, the volume of the solution being strictly equal to the pore volume of the mass of the regenerated catalyst B. The concentration of diethanolamine in aqueous solution is adjusted so as to obtain a molar ratio of diethanolamine to molybdenum already present on the regenerated catalyst B of 2.1 mol/mol. After dry impregnation on the regenerated catalyst B, the catalyst B1 is left to mature for 1 h 30 in a water-saturated chamber and dried under air in an oven at 110° C. for 12 hours.

Example 8—Preparation of a Rejuvenated Catalyst B2 by Addition of Citric Acid and Addition of γ-Ketovaleric Acid (According to the Invention)

The catalyst B2 is prepared by dry impregnation of the regenerated catalyst B with an aqueous solution of citric acid and of γ-ketovaleric acid, the volume of the solution being strictly equal to the pore volume of the mass of the regenerated catalyst B. The concentrations of citric acid and of γ-ketovaleric acid in aqueous solution are adjusted so as to obtain respective ratios of the moles of citric acid and of γ-ketovaleric acid to moles of molybdenum which are already present on the regenerated catalyst B of 0.5 and 0.8. After dry impregnation on the regenerated catalyst B, the catalyst B2 is left to mature for 1 h 30 in a water-saturated chamber and dried under air in an oven at 110° C. for 12 hours.

Example 9—Evaluation of the Catalytic Performance Qualities of the Catalysts a, A1, A2, A3, A4 and A5

A model feedstock representative of a catalytic cracking (FCC) gasoline containing 10% by weight of 2,3-dimethylbut-2-ene and 0.33% by weight of 3-methylthiophene (i.e. 1000 ppm by weight of sulfur in the feedstock) is used for the evaluation of the catalytic performance qualities of the various catalysts. The solvent used is heptane.

The hydrodesulfurization reaction (HDS) is carried out in a fixed traversed bed reactor under a total pressure of 1.5

MPa, at 210° C., at HSV=6 h$^{-1}$ (HSV=flow rate by volume of feedstock/volume of catalyst) and an H$_2$/feedstock ratio by volume of 300 Sl/l, in the presence of 4 ml of catalyst. Prior to the HDS reaction, the catalyst is sulfided in situ at 350° C. for 2 hours under a flow of hydrogen containing 15 mol % of H$_2$S at atmospheric pressure.

Each of the catalysts is placed successively in said reactor. Samples are taken at different time intervals and are analyzed by gas chromatography so as to observe the disappearance of the reactants and the formation of the products.

The catalytic performance qualities of the catalysts are evaluated in terms of catalytic activity and of the selectivity. The hydrodesulfurization (HDS) activity is expressed from the rate constant for the HDS reaction of 3-methylthiophene (kHDS), standardized by the volume of catalyst introduced, and assuming first order kinetics with respect to the sulfur compound. The activity for hydrogenation of the olefins (HydO) is expressed from the rate constant for the hydrogenation reaction of 2,3-dimethylbut-2-ene, standardized by the volume of catalyst introduced, and assuming first order kinetics with respect to the olefin.

The selectivity of the catalyst is expressed by the standardized ratio of the rate constants kHDS/kHydO. The kHDS/kHydO ratio will increase as the catalyst becomes more selective.

The values obtained are standardized by taking the catalyst A as reference (relative HDS activity and relative selectivity equal to 100). The performance qualities are thus the relative HDS activity and the relative selectivity.

TABLE 2

| Catalysts | Relative HDS activity | Relative selectivity |
| --- | --- | --- |
| A (comparative) | 100 | 100 |
| A1 (according to the invention) | 109 | 106 |
| A2 (according to the invention) | 115 | 108 |
| A3 (according to the invention) | 112 | 116 |
| A4 (according to the invention) | 120 | 110 |
| A5 (according to the invention) | 122 | 113 |

The rejuvenated catalysts A1, A2, A3, A4 and A5 exhibit improved activities and selectivities in hydrodesulfurization with respect to the hydrogenation of olefins which are greater than that of the comparative catalyst A (regenerated).

This improvement in selectivity of the catalysts is particularly advantageous in the case of use in a process for the hydrodesulfurization of gasoline containing olefins for which it is sought to limit as much as possible the loss of octane due to the hydrogenation of the olefins.

Example 10—Evaluation of the Catalytic Performance Qualities of the Catalysts B, B1 and B2

The catalysts B (comparative), B1 and B2 (according to the invention) are tested under the conditions described in example 9 above.

TABLE 3

| Catalysts | Relative HDS activity | Relative selectivity |
| --- | --- | --- |
| B (comparative) | 100 | 100 |
| B1 (according to the invention) | 112 | 111 |
| B2 (according to the invention) | 119 | 115 |

The rejuvenated catalysts B1 and B2 exhibit improved activities and selectivities in hydrodesulfurization with respect to the hydrogenation of olefins which are greater than that of the comparative catalyst B (regenerated).

This improvement in selectivity of the catalysts is particularly advantageous in the case of use in a process for the hydrodesulfurization of gasoline containing olefins for which it is sought to limit as much as possible the loss of octane due to the hydrogenation of the olefins.

Example 11—Preparation of a Regenerated Catalyst C (Comparative)

The support of the fresh catalyst is a transition alumina with a specific surface of 140 m$^2$/g and a pore volume of 1.0 cm$^3$/g. The fresh catalyst is prepared by dry impregnation of the support with an aqueous solution of ammonium heptamolybdate and of cobalt nitrate, the volume of the solution containing the precursors of the metals being strictly equal to the pore volume of the mass of support. The concentration of the metal precursors in aqueous solution is adjusted so as to obtain the desired percentage by weight of molybdenum and cobalt on the final catalyst. After dry impregnation on the support, the catalyst is left to mature for 1 h 30 in a water-saturated chamber, dried under air in an oven at 90° C. for 12 hours and then calcined under air at 450° C. for 2 hours.

The fresh catalyst obtained after calcination has a content of 10.4% by weight of molybdenum (MoO$_3$ equivalent) and 3.1% by weight of cobalt (CoO equivalent). This catalyst exhibits a Co/Mo atomic ratio of 0.57.

The fresh catalyst is used to desulfurize a catalytic cracking (FCC) gasoline, the characteristics of which are collated in table 1. The reaction is carried out at 270° C. for 900 hours in a reactor of traversed bed type under the following conditions: P=2 MPa, HSV=4 h$^{-1}$, H$_2$/HC=300 liters/liters of hydrocarbon feedstock. The catalyst is pretreated at 350° C. with a feedstock containing 4% by weight of sulfur in the DMDS (dimethyl disulfide) form in order to provide the sulfidation of the oxide phases. The reaction takes place in an upward stream in an isothermal pilot reactor.

TABLE 4

| S ppm | 392 |
| --- | --- |
| Aromatiques % poids | 41.3 |
| Paraffines % poids | 27.2 |
| Naphténiques % poids | 11.0 |
| Oléfines % poids | 20.5 |
| T5° C. | 62 |
| T95° C. | 225 |

The spent catalyst is withdrawn from the reactor on conclusion of the hydrodesulfurization of a catalytic cracking (FCC) gasoline described above. The spent catalyst is subsequently washed with toluene in a Soxhlet at 250° C. for 7 hours.

The regeneration of the spent/washed catalyst is subsequently carried out in a tubular oven under dry air at 450° C. for 2 hours and the regenerated catalyst C is obtained.

Example 12—Preparation of Rejuvenated Catalysts C1 and C2 by Addition of Citric Acid (According to the Invention)

The catalyst C1 is prepared by dry impregnation of the regenerated catalyst C with an aqueous citric acid solution, the volume of the solution being strictly equal to the pore volume of the mass of the catalyst C. The concentration of citric acid in aqueous solution is adjusted so as to obtain a molar ratio of citric acid to molybdenum already present on the regenerated catalyst C of 0.3 mol/mol. After dry impregnation on the regenerated catalyst C, the catalyst C1 is left to mature for 1 h 30 in a water-saturated chamber and dried under air in an oven at 90° C. for 12 hours. The catalyst C1 exhibits a specific surface of 127 m$^2$/g and a volume of 0.86 cm$^3$/g. The residual carbon and sulfur contents of the catalyst C1 are respectively 0.16 wt % and 0.59 wt %.

The catalyst C2 is obtained in a similar way but by using an aqueous citric acid solution, the concentration of which is adjusted so as to obtain a molar ratio of citric acid to molybdenum already present on the regenerated catalyst C of 0.9. The catalyst C2 exhibits a specific surface of 130 m$^2$/g and a volume of 0.86 cm$^3$/g. The residual carbon and sulfur contents of the catalyst C2 are respectively 0.19 wt % and 0.58 wt %.

Example 13—Preparation of a Rejuvenated Catalyst C3 by Addition of Ascorbic Acid (According to the Invention)

The catalyst C3 is prepared by dry impregnation of the regenerated catalyst C with an aqueous ascorbic acid solution, the volume of the solution being strictly equal to the pore volume of the mass of the regenerated catalyst C. The concentration of ascorbic acid in aqueous solution is adjusted so as to obtain a molar ratio of ascorbic acid to molybdenum already present on the regenerated catalyst C of 0.5 mol/mol. After dry impregnation on the regenerated catalyst C, the catalyst C3 is left to mature for 1 h 30 in a water-saturated chamber and dried under air in an oven at 120° C. for 12 hours.

The catalyst C3 exhibits a specific surface of 127 m$^2$/g and a volume of 0.86 cm$^3$/g. The residual carbon and sulfur contents of the catalyst C3 are respectively 0.17 wt % and 0.59 wt %.

Example 14—Preparation of a Rejuvenated Catalyst C4 by Addition of Triethylene Glycol (According to the Invention)

The catalyst C4 is prepared by dry impregnation of the regenerated catalyst C with an aqueous triethylene glycol solution, the volume of the solution being strictly equal to the pore volume of the mass of the regenerated catalyst C. The concentration of triethylene glycol in aqueous solution is adjusted so as to obtain a molar ratio of triethylene glycol to molybdenum already present on the regenerated catalyst C of 0.6 mol/mol. After dry impregnation on the regenerated catalyst C, the catalyst C4 is left to mature for 1 h 30 in a water-saturated chamber and dried under air in an oven at 140° C. for 12 hours.

The catalyst C4 exhibits a specific surface of 126 m$^2$/g and a volume of 0.86 cm$^3$/g. The residual carbon and sulfur contents of the catalyst C4 are respectively 0.16 wt % and 0.57 wt %.

Example 15—Preparation of a Rejuvenated Catalyst C5 by Addition of Citric Acid and Addition of Urea (According to the Invention)

The catalyst C5 is prepared by dry impregnation of the regenerated catalyst C with an aqueous solution of citric acid and of urea, the volume of the solution being strictly equal to the pore volume of the mass of the regenerated catalyst C. The concentrations of citric acid and of urea in aqueous solution are adjusted so as to obtain respective ratios of the moles of citric acid and of urea to moles of molybdenum which are already present on the regenerated catalyst C of 0.2 and 1.25. After dry impregnation on the regenerated catalyst C, the catalyst C5 is left to mature for 1 h 30 in a water-saturated chamber and dried under air in an oven at 110° C. for 12 hours.

The catalyst C5 exhibits a specific surface of 127 m$^2$/g and a volume of 0.87 cm$^3$/g. The residual carbon and sulfur contents of the catalyst C5 are respectively 0.14 wt % and 0.59 wt %.

Example 16—Evaluation of the Catalytic Performance Qualities of the Catalysts C, C1, C2, C3, C4 and C5

The catalysts C (comparative), C1 and C2 (according to the invention) are tested under the conditions described in example 9 above.

TABLE 5

| Catalysts | Relative HDS activity | Relative selectivity |
| --- | --- | --- |
| C (comparative) | | |
| C1 (according to the invention) | 107 | 105 |
| C2 (according to the invention) | 111 | 111 |
| C3 (according to the invention) | 112 | 108 |
| C4 (according to the invention) | 122 | 116 |
| C5 (according to the invention) | 118 | 114 |

The rejuvenated catalysts C1, C2, C3, C4 and C5 exhibit improved activities and selectivities in hydrodesulfurization with respect to the hydrogenation of olefins which are greater than that of the comparative catalyst C (regenerated).

This improvement in selectivity of the catalysts is particularly advantageous in the case of use in a process for the hydrodesulfurization of gasoline containing olefins for which it is sought to limit as much as possible the loss of octane due to the hydrogenation of the olefins.

The invention claimed is:

1. A process for the hydrodesulfurization of a sulfur-containing olefinic gasoline cut in which said gasoline cut, hydrogen and a rejuvenated catalyst are brought into contact, said hydrodesulfurization process being carried out at a temperature of between 200° C. and 400° C., a total pressure of between 1 and 3 MPa, an hourly space velocity, defined as being the flow rate by volume of feedstock relative to the volume of catalyst, of between 1 and 10 h$^{-1}$ and a hydrogen/ gasoline feedstock ratio by volume of between 100 and 1200 Sl/L, said rejuvenated catalyst resulting from a hydrotreating process and comprises at least one metal from group VIII, at least one metal from group VIb, an oxide support and at least one organic compound containing oxygen and/or nitrogen and/or sulfur, wherein the process is carried out in a catalytic bed of a reactor of the fixed bed type containing several catalytic beds; at least one other catalytic bed upstream or downstream of the catalytic bed containing the rejuvenated catalyst in the direction of the circulation of the feedstock contains at least in part a fresh catalyst and/or a regenerated catalyst.

2. The process as claimed in claim 1, wherein the organic compound containing oxygen and/or nitrogen and/or sulfur is chosen from a compound comprising one or more chemical functional groups selected from the group consisting of carboxylic, alcohol, thiol, thioether, sulfone, sulfoxide, ether, aldehyde, ketone, ester, carbonate, amine, nitrile, imide, oxime, urea, amide functional group, compounds including a furan ring and sugars.

3. The process as claimed in claim 1, wherein the organic compound containing oxygen and/or nitrogen and/or sulfur selected from the group consisting of γ-valerolactone, 2-acetylbutyrolactone, triethylene glycol, diethylene glycol, ethylene glycol, ethylenediaminetetraacetic acid, maleic acid, malonic acid, citric acid, gluconic acid, di($C_1$-$C_4$ alkyl) succinate, glucose, fructose, sucrose, sorbitol, xylitol, γ-ketovaleric acid, dimethylformamide, 1-methyl-2-pyrrolidinone, propylene carbonate, 2-methoxyethyl 3-oxobutanoate, bicine, tricine, 2-furaldehyde, 5-hydroxymethylfurfural, 2-acetylfuran, 5-methyl-2-furaldehyde, ascorbic acid, butyl lactate, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1-(2-hydroxyethyl) pyrrolidinone, 1-(2-hydroxyethyl)-2,5-pyrrolidinedione, 5-methyl-2(3H)-furanone, 1-methyl-2-piperidinone and 4-aminobutanoic acid.

4. The process as claimed in claim 1, in which the rejuvenated catalyst has a content of metal from group VIb of between 1% and 40% by weight of oxide of said metal from group VIb, with respect to the total weight of the rejuvenated catalyst, and a content of metal from group VIII of between 0.1% and 10% by weight of oxide of said metal from group VIII, with respect to the total weight of the rejuvenated catalyst.

5. The process as claimed in claim 1, in which the rejuvenated catalyst additionally contains phosphorus, the phosphorus content being between 0.3% and 10% by weight, expressed as $P_2O_5$, with respect to the total weight of the rejuvenated catalyst and the phosphorus/(metal from group VIb) molar ratio in the rejuvenated catalyst is between 0.1 and 0.7.

6. The process as claimed in claim 1, in which the rejuvenated catalyst is characterized by a specific surface of between 20 and 200 $m^2$/g.

7. The process as claimed in claim 1, in which the oxide support of the rejuvenated catalyst is aluminas, silica, titanium, or magnesium oxides, used alone or as a mixture with alumina or silica-alumina.

8. The process as claimed in claim 1, in which the rejuvenated catalyst contains residual carbon at a content of less than 2% by weight, with respect to the total weight of the rejuvenated catalyst.

9. The process as claimed in claim 1, in which the rejuvenated catalyst contains residual sulfur at a content of less than 5% by weight, with respect to the total weight of the rejuvenated catalyst.

10. The process as claimed in claim 1, in which the rejuvenated catalyst results from a process for the hydrodesulfurization of a sulfur-containing olefinic gasoline cut.

11. The process as claimed in claim 1, in which the rejuvenated catalyst is subjected to a sulfidation stage before or during the hydrodesulfurization process.

12. The process as claimed in claim 1, in which the gasoline cut is a gasoline resulting from a catalytic cracking unit.

13. The process as claimed in claim 1, which is carried out in at least two reactors in series of the fixed bed type; at least one of the reactors contains a rejuvenated catalyst while another reactor contains a fresh catalyst or a regenerated catalyst, or a mixture of a rejuvenated catalyst and of a fresh and/or regenerated catalyst, in any order, with or without removal of at least a part of the $H_2S$ from the effluent resulting from the first reactor before treating said effluent in the second reactor.

14. A process for the hydrodesulfurization of a sulfur-containing olefinic gasoline cut in which said gasoline cut, hydrogen and a rejuvenated catalyst are brought into contact, said hydrodesulfurization process being carried out at a temperature of between 200° C. and 400° C., a total pressure of between 1 and 3 MPa, an hourly space velocity, defined as being the flow rate by volume of feedstock relative to the volume of catalyst, of between 1 and 10 $h^{-1}$ and a hydrogen/gasoline feedstock ratio by volume of between 100 and 1200 Sl/l, said rejuvenated catalyst resulting from a hydrotreating process and comprises at least one metal from group VIII, at least one metal from group VIb, an oxide support and at least one organic compound containing oxygen and/or nitrogen and/or sulfur, wherein the process is carried out in at least two reactors in series of the fixed bed type or of the ebullated bed type; at least one of the reactors contains a rejuvenated catalyst while another reactor contains a fresh catalyst or a regenerated catalyst, or a mixture of a rejuvenated catalyst and of a fresh and/or regenerated catalyst, in any order, with or without removal of at least a part of the $H_2S$ from the effluent resulting from the first reactor before treating said effluent in the second reactor.

\* \* \* \* \*